United States Patent
Leber et al.

(10) Patent No.: US 9,870,295 B2
(45) Date of Patent: Jan. 16, 2018

(54) AUTOMATION OF WORKFLOW CREATION AND FAILURE RECOVERY

(71) Applicant: General Electric Company, Schenectady, NY (US)

(72) Inventors: Christina Ann Leber, Niskayuna, NY (US); John A. Interrante, Niskayuna, NY (US); Kareem Sherif Aggour, Niskayuna, NY (US); Jenny Marie Weisenberg Williams, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/335,315

(22) Filed: Jul. 18, 2014

(65) Prior Publication Data

US 2016/0019091 A1    Jan. 21, 2016

(51) Int. Cl.
*G06F 9/48* (2006.01)
*G06F 11/34* (2006.01)
(Continued)

(52) U.S. Cl.
CPC ......... *G06F 11/34* (2013.01); *G06F 11/1466* (2013.01); *G06F 9/46* (2013.01)

(58) Field of Classification Search
CPC .. G06F 9/4881; G06F 11/1466; G06F 9/5027; G06F 11/0709; G06F 9/4843; G06F 9/5038

See application file for complete search history.

(56) References Cited

U.S. PATENT DOCUMENTS

| 7,721,288 B2 * | 5/2010 | Wu ................... G06F 9/4843 370/230 |
| 7,958,511 B1 * | 6/2011 | Pomerantsev ....... G06F 9/5027 718/104 |

(Continued)

FOREIGN PATENT DOCUMENTS

| CN | 102903009 A | 1/2013 |
| WO | 2013/036677 A1 | 3/2013 |
| WO | 2014/003970 A1 | 1/2014 |

OTHER PUBLICATIONS

Abouzeid, Azza, et al. 2009. "HadoopDB: an architectural hybrid of MapReduce and DBMS technologies for analytical workloads." Proceedings of the VLDB Endowment 2.1. pp. 922-933.*

(Continued)

*Primary Examiner* — Lewis A Bullock, Jr.
*Assistant Examiner* — Gilles Kepnang
(74) *Attorney, Agent, or Firm* — GE Global Patent Operation (57) ABSTRACT

A system includes a processor and a non-transitory computer-readable medium. The non-transitory computer-readable medium comprises instructions executable by the processor to cause the system to perform a method. The method comprises receiving a first job to execute and executing the first job. A plurality of data associated with the first job is determined. The plurality of data comprises data associated with (i) a second job executed immediately prior to the first job, (ii) a third job executed immediately after the first job, (iii) a determination of whether the first job failed or executed successfully and (iv) a type of data associated with the first job. The determined plurality of data is stored.

13 Claims, 7 Drawing Sheets

(51) Int. Cl.
*G06F 11/14* (2006.01)
*G06F 9/46* (2006.01)

(56) References Cited

U.S. PATENT DOCUMENTS

| | | | |
|---|---|---|---|
| 8,108,878 B1* | 1/2012 | Pulsipher | G06F 9/524 |
| | | | 718/100 |
| 9,183,253 B2* | 11/2015 | Hacigumus | G06F 17/30448 |
| 2004/0216002 A1* | 10/2004 | Fromherz | G06Q 10/06 |
| | | | 714/25 |
| 2005/0010608 A1* | 1/2005 | Horikawa | G06F 9/4862 |
| 2006/0053334 A1* | 3/2006 | Ingen | G06F 11/1466 |
| | | | 714/2 |
| 2007/0219839 A1* | 9/2007 | Tanabe | G06F 9/45512 |
| | | | 705/7.26 |
| 2008/0256549 A1* | 10/2008 | Liu | G06F 9/4881 |
| | | | 718/106 |
| 2009/0070767 A1* | 3/2009 | Garbow | G06F 9/5066 |
| | | | 718/104 |
| 2009/0177671 A1* | 7/2009 | Pellegrini | G06F 9/5038 |
| 2009/0222818 A1* | 9/2009 | Valentin | G06Q 10/06 |
| | | | 718/100 |
| 2010/0211815 A1* | 8/2010 | Mankovskii | G06F 11/0709 |
| | | | 714/2 |
| 2010/0281484 A1* | 11/2010 | Myhre | G06F 9/544 |
| | | | 718/102 |
| 2013/0219406 A1* | 8/2013 | Hatabe | G06F 9/46 |
| | | | 718/105 |
| 2013/0275363 A1 | 10/2013 | Wu et al. | |
| 2013/0282668 A1 | 10/2013 | Hsieh | |
| 2013/0345999 A1 | 12/2013 | Hafen et al. | |
| 2014/0019405 A1 | 1/2014 | Borthakur et al. | |
| 2014/0282605 A1* | 9/2014 | Jacobson | G06F 9/461 |
| | | | 718/107 |
| 2014/0325517 A1* | 10/2014 | Takahashi | G06F 9/5077 |
| | | | 718/102 |
| 2015/0160974 A1* | 6/2015 | Kishore | G06F 9/4881 |
| | | | 718/106 |

OTHER PUBLICATIONS

Laptev, Nikolay et al. 2012. "Early accurate results for advanced analytics on mapreduce." Proceedings of the VLDB Endowment 5.10. pp. 1028-1039.*

Geva, Tom "Workload Automation: Predicting Trends in 2014", BMC Communities, Jan. 15, 2014, 2pgs.

"Oozie Specification, a Hadoop Workflow System", (v3.1), Jun. 6, 2012, 48pgs.

Berger, Michael et al., "A Learning Component for Workflow Management Systems", Proceedings of the Thirty-First Hawaii International Conference, vol. 7, Jan. 1998, 10pgs.

* cited by examiner

| | Previous Job | Next Job | Data Type | Job Type | Fail? |
|---|---|---|---|---|---|
| 1 | | 2 | bin | Transform X | N |
| 2 | 1 | 3 | txt | Transform Y | N |
| 3 | 2 | 4 | hex | Transform Z | N |
| 4 | 3 | 5 | bin | Transform X | Y |
| 5 | 4 | 2 | hex | Transform Z | N |
| 6 | 3 | 5 | bin | Transform X | N |

AUTOMATION OF WORKFLOW CREATION AND FAILURE RECOVERY

BACKGROUND

Large datasets (e.g., collections of data) may be manipulated using a workflow that comprises a string or pipeline of analytic jobs. The string of analytic jobs may be sequenced together to accomplish a goal such as, but not limited to, transforming data, searching data, or verifying data. Creating a workflow of analytic jobs when working with a large dataset can be time-consuming, even for an expert, because creating the workflow may require manual changes to the workflow as it executes. For example, if one of the analytic jobs in the workflow encounters a fault condition (e.g., the job becomes stuck or encounters an endless loop), that analytic job may fail and the user who submitted the workflow may be required to intervene.

Determining that an analytic job has failed may not be immediate due to the time needed to process large datasets. Therefore, the user who submitted the workflow may be required to rerun certain portions of the workflow when a condition occurs that the workflow can not accommodate (e.g., a fault condition). Rerunning portions of the workflow may delay a workflow from completing and, when a large dataset is being analyzed, the delays may be a factor of days. Therefore, reducing delays in the execution of a workflow of analytic jobs is desirable.

SUMMARY

In some embodiments, a method includes receiving a first job to execute and executing the first job. A plurality of data associated with the first job is determined. The plurality of data comprises data associated with (i) a second job executed immediately prior to the first job, (ii) a third job executed immediately after the first job, (iii) a determination of whether the first job failed or executed successfully and (iv) a type of data associated with the first job. The determined plurality of data is stored.

In some embodiments, a non-transitory computer-readable medium includes instructions that, when executed by a processor, perform a method. The method includes receiving a first job to execute and executing the first job. A plurality of data associated with the first job is determined. The plurality of data comprises data associated with (i) a second job executed immediately prior to the first job, (ii) a third job executed immediately after the first job, (iii) a determination of whether the first job failed or executed successfully and (iv) a type of data associated with the first job. The determined plurality of data is stored.

In some embodiments, a system includes a processor and a non-transitory computer-readable medium. The non-transitory computer-readable medium comprises instructions executable by the processor to cause the system to perform a method. The method includes receiving a first job to execute and executing the first job. A plurality of data associated with the first job is determined. The plurality of data comprises data associated with (i) a second job executed immediately prior to the first job, (ii) a third job executed immediately after the first job, (iii) a determination of whether the first job failed or executed successfully and (iv) a type of data associated with the first job. The determined plurality of data is stored.

DESCRIPTION

Some of the present embodiments relate to a method and system for providing assistance, guidance, and automation associated with workflow analytic jobs. For example, the present embodiments may provide assistance in the creation of workflows using an intelligent decision-making system which may display, to a developer, workflow related jobs based on a presently selected job and on previously executed analytic job results and job metadata (e.g., job input and job output). The present embodiments may also relate to selecting analytic jobs and stringing the analytic jobs together in a progressive order to create a workflow while inspecting the workflow for abnormal conditions and taking proper corrective actions. In some embodiments, an intelligent pipeline manager may detect a failure in the workflow and may either recover from the failure, or the intelligent pipeline manager may abort a currently-executing work flow since failures may be time consuming. In some embodiments, the intelligent pipeline manager may automatically recover from failures and then, based on the previous jobs and/or experience determined from previous workflows, intelligently decide which jobs to execute next. The intelligent pipeline manager may be capable of dynamically adjusting a chain of analytic jobs during execution as certain conditions occur.

Figure 1:
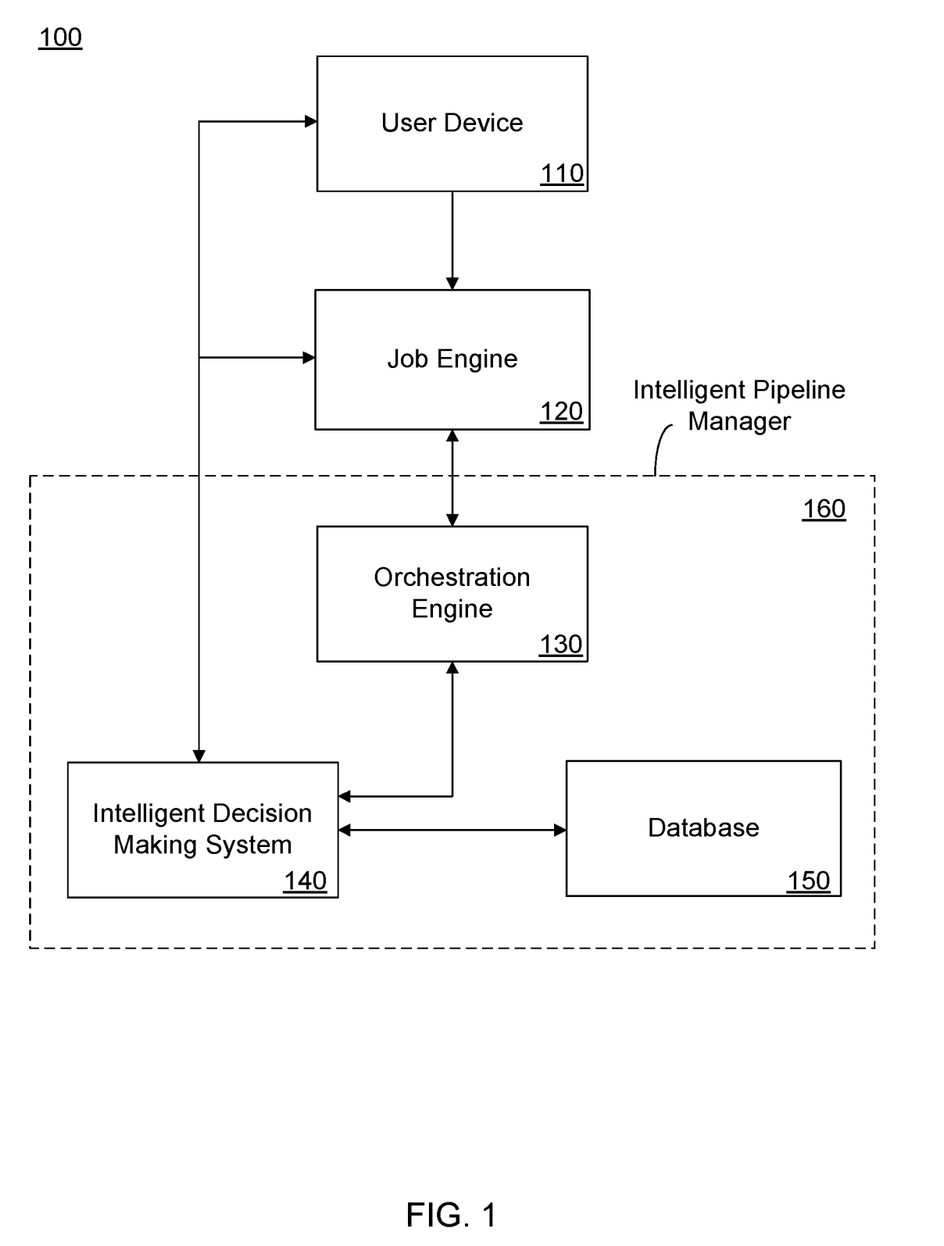
FIG. 1 is a block diagram of a system according to some embodiments.

Now referring to FIG. 1, an embodiment of a system 100 is illustrated. The system 100 may comprise an intelligent pipeline manager 160, a job engine 120 and a user device 110. The system 100 may relate to monitoring the job engine 120 by using the intelligent pipeline manager 160. The user device 110 may comprise a computing device (e.g., a device that comprises a processor and a display) that facilitates a user's interactions with the job engine 120 and allows the user to receive information from the intelligent pipeline manager 160. The job engine 120 may comprise a cluster of servers. For example, the job engine may comprise a cluster of servers running Hadoop®. Hadoop® may comprise an open-source software framework for storage and large-scale processing of datasets on commodity hardware clusters. Commodity hardware clusters may comprise a large numbers of already-available computing components (e.g., servers) for parallel computing.

The intelligent pipeline manager 160 may comprise an orchestration engine 130, an intelligent decision-making system 140 and a database 150. As illustrated, the intelligent pipeline manager 160 comprises an integrated database 150. However, the database 150 may comprise an external database that interfaces with the intelligent pipeline manager 160. For example, the intelligent pipeline manager 160 may interface with the database 150 via a computer network. Furthermore, in some embodiments, the intelligent pipeline manager 160 may be integrated into the job engine 120.

The orchestration engine 130 may monitor and manage execution of a workflow and the jobs associated with the workflow. The orchestration engine 130 may determine whether or not each job of the workflow completed correctly after each job of a workflow finishes. For example, orchestration engine 130 may determine if a job is stuck in a loop, if the job wrote to an error log, if the job stopped executing before indicating a successful execution (e.g. the job is frozen) or if the job indicated that is completed correctly. If the job completed correctly, the orchestration engine 130 may indicate that a next job in the workflow is to be executed. In some embodiments, the orchestration engine 130 may (i) execute a recovery strategy that was indicated by a user or (ii) the orchestration engine 130 may automatically determine a best course of action. For example, the orchestration engine 130 may retry a job that has failed using the same input data as used originally to see if a subsequent run will succeed. In some embodiments, the orchestration engine 130 may substitute another job that may present a viable alternative to the failed job. If no substitute jobs exist, the orchestration engine 130 may exit the workflow early rather than trying (and failing) to run any remaining jobs of the workflow. In some embodiments, the orchestration engine 130 may follow a series of recovery steps indicated by a user defined recovery strategy.

When a fault condition occurs, as described above, the orchestration engine 130 may instruct the intelligent decision-making system 140 to query the database 150 to determine if similar jobs might be used as a substitute to the failed job. Based on the results of the query, the orchestration engine 130 can indicate to the job engine 120 to run one or more substitute jobs instead of the failed job. In some embodiments, the orchestration engine 130 may dynamically handle faults by automatically finding one or more jobs that may be used in place of a single failed job. For example two jobs, that when combined, may perform a same function as the failed job.

The intelligent decision-making system 140 may assist a user in determining which workflows are possible and which workflows make practical sense. The intelligent decision-making system 140 may capture information such as job inputs, job outputs, features of datasets (e.g., data type) on which the job has been run, and which analytic jobs have been run successfully and unsuccessfully. The intelligent decision-making system 140 may be implemented as a hybrid-recommender system which bases its decisions using both collaborative and content-based filtering. Using these two methods, the intelligent decision-making system 140 may (i) determine types of analytic jobs a user might be interested in and (ii) recommend analytic jobs as a user is constructing a workflow (e.g., putting together a series of analytic jobs). The intelligent decision-making system 140 may detect if a user is constructing a workflow that historically has not worked and may recommend one or more alternative analytic jobs.

Collaborative filtering may capture information about a dataset's features as well as job metadata which are used to create a user profile. For example, if the intelligent decision-making system 140 knows that a user runs analytic jobs on time-series data, the intelligent decision-making system 140 may not recommend text processing jobs to that user. In other words, the intelligent decision-making system 140 may associate a user's profile with a data type which the user's datasets typically comprise. The intelligent decision-making system 140 may also be capable of leveraging the user profile to find similar users and to recommend analytic jobs based on analytic jobs that the similar users used in similar situations.

Content filtering may use job metadata to find similar jobs. The intelligent decision-making system 140 may look at a chain of analytic jobs that a user has put together (including job input and job output), determine a type of analytic job that might come next (e.g., a logical next analytical job in a sequence of analytical jobs), and recommend analytic jobs of that type to a user. The recommendation may be based on which jobs have historically come before and after other analytic jobs. If a user selects a data transformation job that is often followed by a specific operation (e.g., a specific transformation or a specific search), the intelligent decision-making system 140 may recommend different operations that match the outputs of the data trans formation job.

One advantage of the intelligent decision-making system 140 is its ability to enable users that are not experts in workflow creation to be able to create new chains of analytic jobs resulting in less time to create a working workflow of analytic jobs and less manual intervention which may enable quicker turnaround of large data processing jobs. In some embodiments, when a computer server is running a self-diagnostic and detects a variation from what is expected, the server may use the intelligent decision-making system 140 to automatically run another diagnostic program and then decide what else to run based on that output without human intervention. The intelligent decision-making system 140 may then report the results of the diagnostics for a human user to take action while providing more information than a simple notice that an alarm has triggered. In a similar manner, the pipeline manager 400 may dynamically detect failures in the chain of analytic jobs and take appropriate action (such as aborting the workflow, retrying an analytic job, going to a next analytic job to try, etc.).

Figure 2:
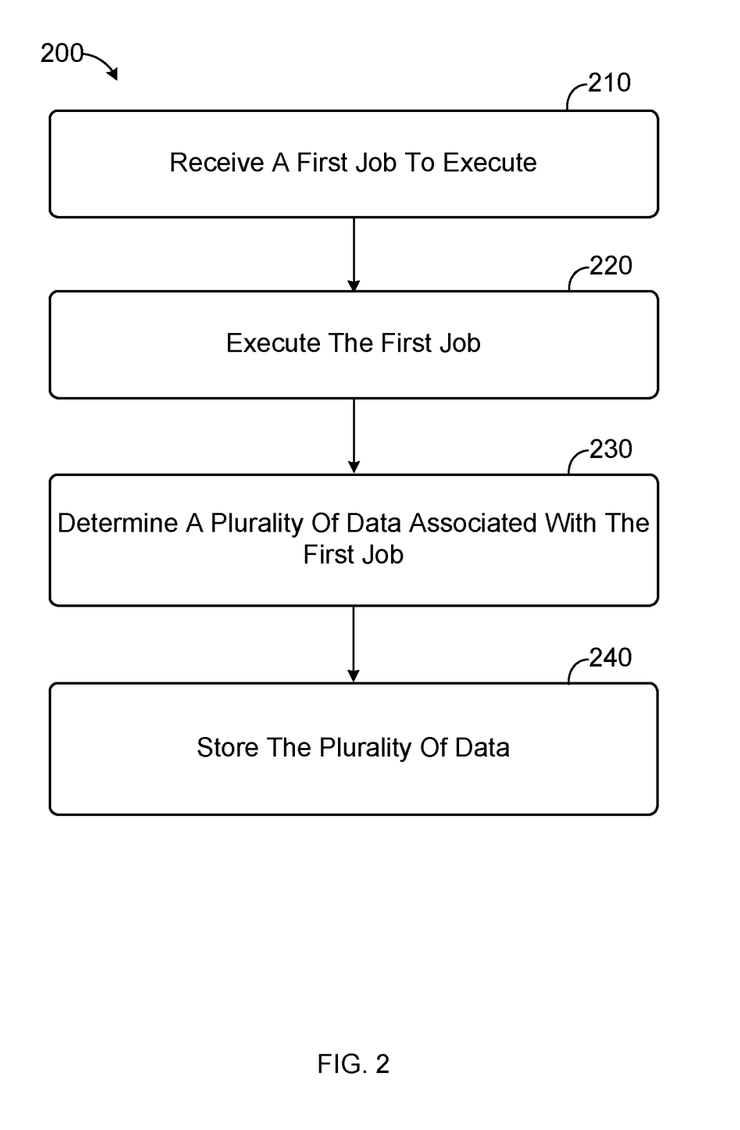
FIG. 2 is a flow diagram of a process according to some embodiments.

Referring now to FIG. 2, an embodiment of a process 200 is illustrated. In some embodiments, various hardware elements (e.g., a processor) of an intelligent pipeline manager perform the process 200. The process 200 and other processes mentioned herein may be embodied in processor-executable program code read from one or more non-transitory computer-readable media, such as a floppy disk, a CD-ROM, a DVD-ROM, a Flash drive, and a magnetic tape, and may be stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at 210, a first job to execute is received. The first job may comprise an analytic job associated with a workflow. The first job may comprise a computer-implemented job that is used to manipulate or search a dataset. The first job may be executed at 220. The executed first job may be executed using multiple servers for parallel processing as described with respect to FIG. 1.

At 230 a plurality of data associated with the first job may be determined. The plurality of data may be determined via a processor, such as the processor described with respect to FIG. 7. The plurality of data may comprise, a job identifier associated with the first job, a job identifier associated with a second job executed immediately prior to the first job, a third job executed immediately after the first job, a listing of associated jobs in a current workflow, a determination if the first job failed or executed successfully, a type of search, a type of data transformation, job inputs, job outputs and/or a type of data associated with the first job.

The plurality of data may be stored at 240. The plurality of data may be stored in a database such as the database described with respect to FIG. 1. By storing the plurality of data associated with a plurality of jobs, an intelligent pipeline manager, as described with respect to FIG. 1, may use the stored plurality of data to automatically provide assistance, guidance, and automation associated with analytic jobs executed as part of a workflow by (i) selecting analytic jobs and chaining them together in progressive order while inspecting the results for abnormal conditions and taking proper corrective actions and (ii) detecting a failure and automatically recovering from the failure by determining a substitute job or by aborting the currently executing workflow.

Figure 3:
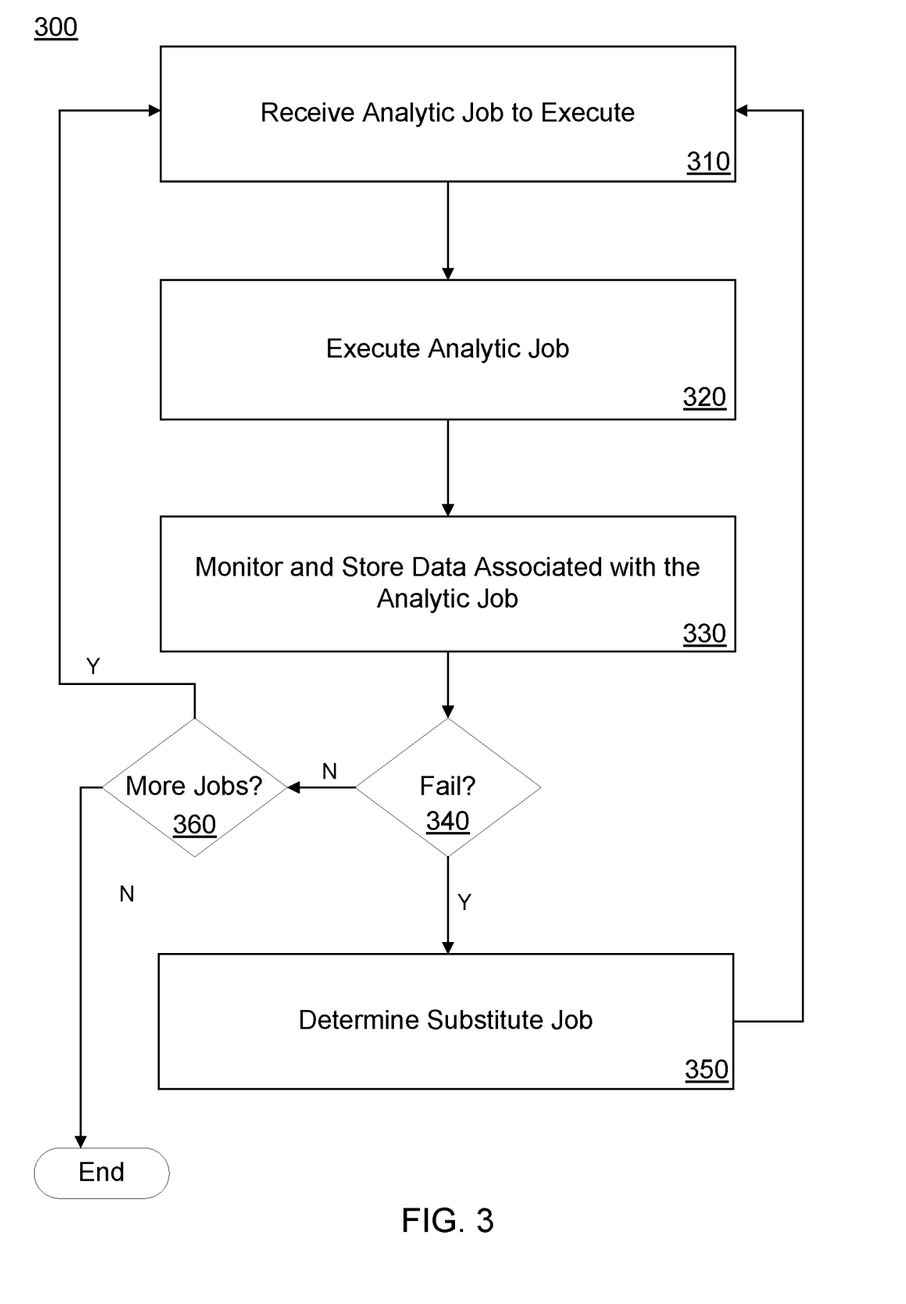
FIG. 3 is a flow diagram of a process according to some embodiments.

Now referring to FIG. 3, an embodiment of a process 300 is illustrated. Process 300 relates to automatically detecting a failure during execution of a workflow and determining a substitute job for an analytic job that has failed. At 310, an analytic job to execute is received. The analytic job may be one of a plurality of jobs that are submitted as part of a workflow and the analytic job may comprise a computer-implemented job that is used to manipulate or search a dataset.

For illustrative purposes, and to aid in understanding features of the specification, an example will be introduced. This example is not intended to limit the scope of the claims. For example, a turbine technician may be very familiar with turbines and somewhat familiar with data captured by sensors located on the turbines. However, the technician may be inexperienced with running analytics on the sensor data. In this example, the technician has noticed a recurring failure on a turbine and wishes to analyze the turbine sensor data to determine if a recurring problem is indicated by the sensor data. The turbine technician may submit a workflow that (i) searches the sensor data for pertinent data and (ii) converts the pertinent data to a format that is readable for his diagnostic computer program.

Next, at 320, the analytic job is executed. For example, the analytic job may be executed by a processor. In one embodiment, the analytic job may be continually monitored by a monitoring process at 330 for evidence of a failure. However, in some embodiments, the analytic job may be periodically monitored to determine if the job failed at 330. The monitoring process may also determine a job identifier associated with the analytic job as well as a job identifier associated with a job executed immediately prior to the analytic job and a job executed immediately after the analytic job. The monitoring process may determine a type of job (e.g., a type of search or a type of data transformation) and a type of data associated with the analytic job. The data determined by the monitoring process may be stored at 330.

Figure 4:
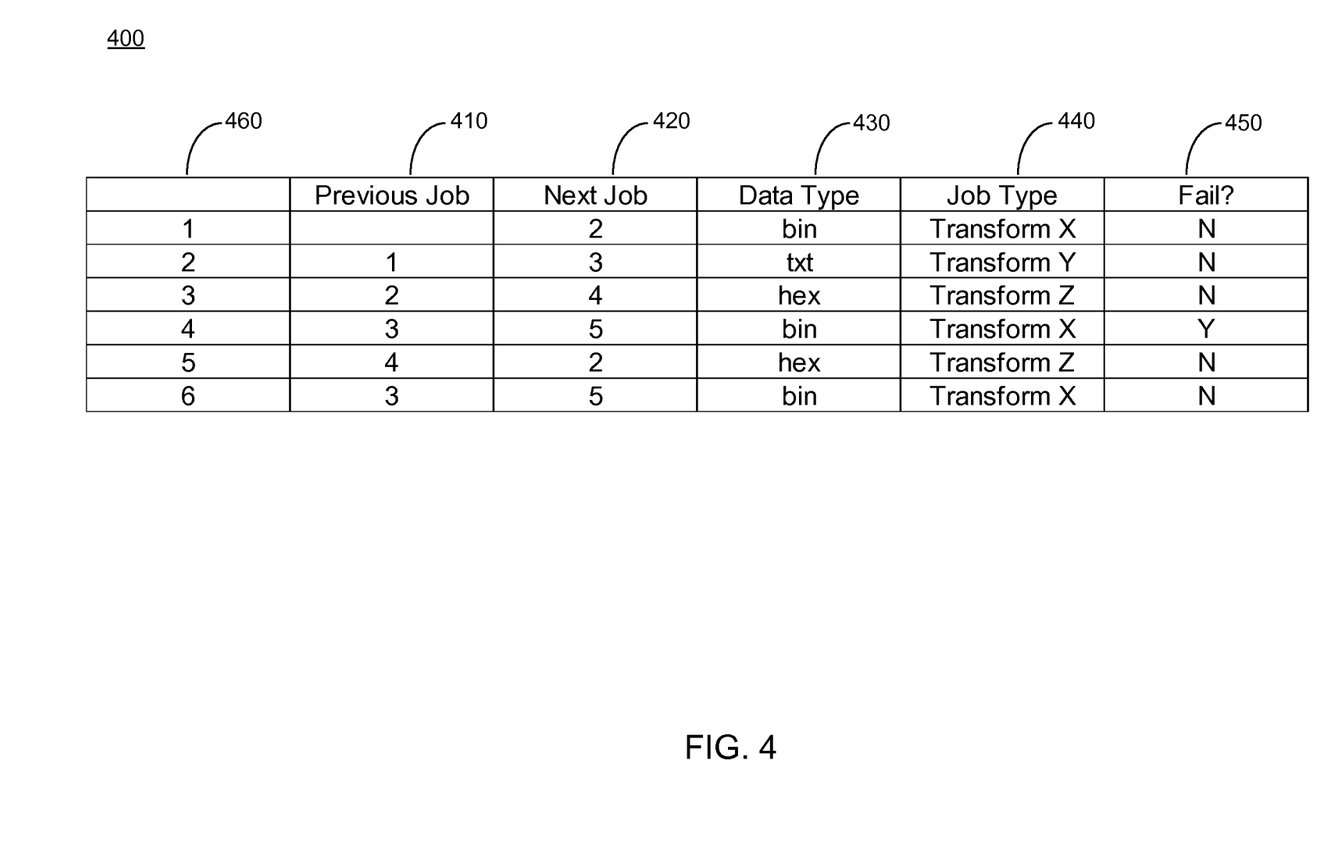
FIG. 4 is a portion of a database table according to some embodiments.

Continuing with the above example, and now referring to FIG. 4, a portion of a database table 400 is illustrated. The database table 400 may illustrate data that was determined by a monitoring process. The database table may include, for example, entries identifying job related data associated with a current job identifier. The table may also define fields 410, 420, 430, 440, 450 and 460 for each of the entries. The fields 410, 420, 430, 440, 450 and 460 may, according to some embodiments, define: a previous job identifier 410, a next job identifier 420 a data type 430, a job type 440, a job failure indicator 450 and a current job identifier 460. The information in the database table 400 may be created and updated, for example, based on data received from a monitoring process.

Referring back to FIG. 3, if it is determined that the analytic job failed at 340, then the existence of a substitute job that can replace the failed analytic job (e.g., replace the failed job in the workflow) may be automatically determined. The determination as to the existence of a substitute job may be performed by an intelligent pipeline manager, which is described in more detail in FIG. 1. The intelligent pipeline manager may base its determination on (i) the data associated with the job that failed and (ii) data associated with potential substitute jobs.

Continuing with the above example, and again referring to FIG. 4, if the intelligent pipeline manager determines that job number 4 has failed, the intelligent pipeline manager may query a database associated with the database table 400 to determine if a substitute job exits. In the present example, the intelligence pipeline manager may determine that job number 6 is a substitute for job number 4 because job number 6 has the same, or similar attributes, in the database table as job number 4. Moreover, job number 6 is indicated in the database table 400 as executing successfully (e.g., it has not failed).

Referring back to FIG. 3, once a substitute job has been determined at 350, the failed job may be automatically replaced by the substitute job in the currently executing workflow and the substitute job may be executed at 320. By automatically replacing a failed job with a substitute job, a workflow failure may be automatically corrected which may minimize time lost due to a failure. The process 300 continues at 360 to determine if the workflow includes more jobs to execute.

Figure 5:
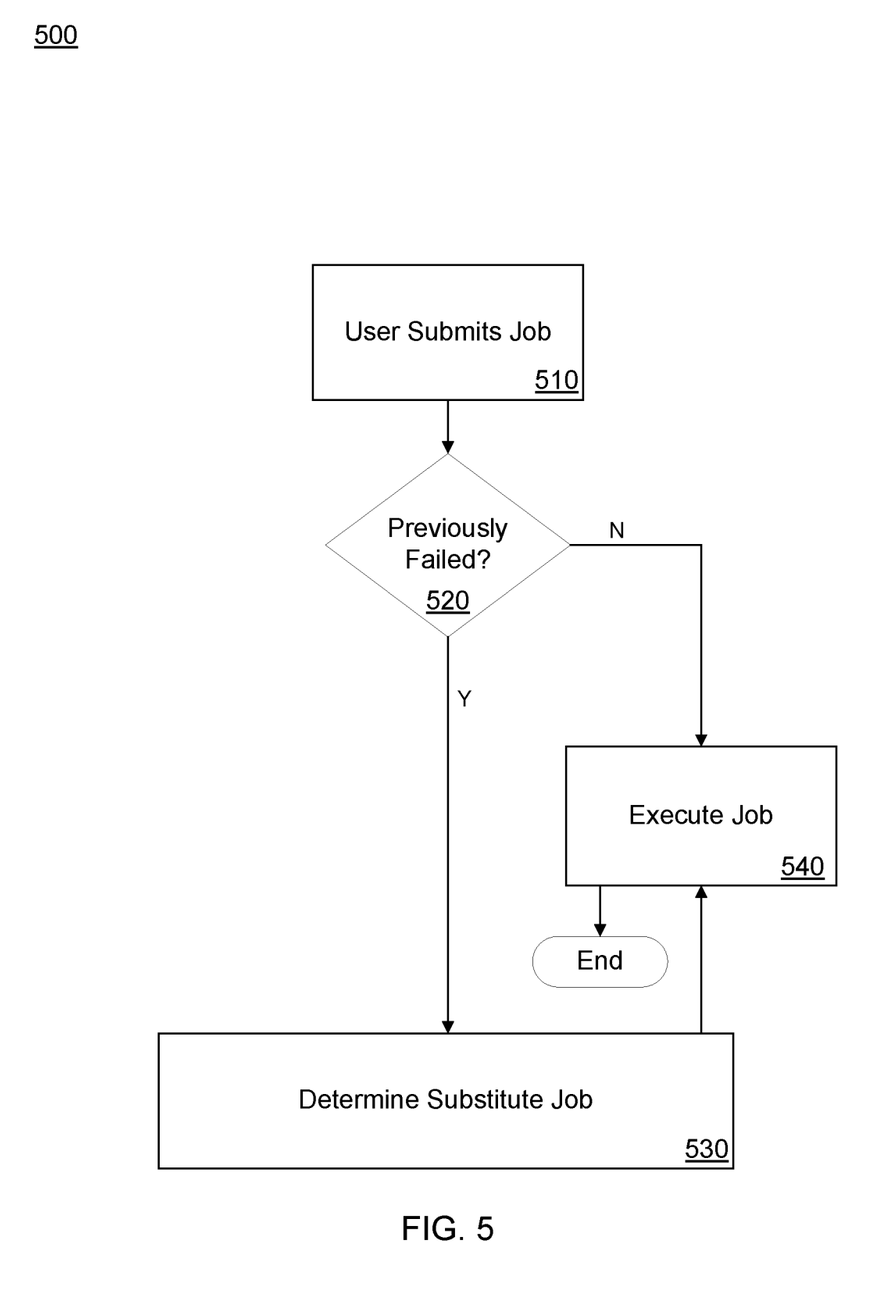
FIG. 5 is a flow diagram of a process according to some embodiments.

Now referring to FIG. 5, an embodiment of a process 500 is illustrated. Process 500 may relate to determining whether a newly submitted job will fail prior to executing the job. At 510, a user may submit a job to a job engine, such as job engine 120. The job engine may be monitored by an orchestration engine that queries an intelligent decision-making system to determine if the newly submitted job has previously failed at 520. If the job has not previously failed, the job may be submitted to a job engine to be executed at 540. However, if the job has previously failed, the intelligent decision-making system may determine a substitute job for the failed job by querying a database, such as database 150.

For example, and referring to FIG. 4, a technician may submit job number 3 to a job engine to analyze turbine sensor data in hope of determining whether a recurring problem is indicated by the sensor data. The orchestration engine may query an intelligent decision-making system to determine if job number 4 has previously failed. As indicated in database table 400, job number 4 has previously failed. The intelligent decision-making system may then determine that job number 6 may be a substitute job for job number 4 and may either submit job number 6 to the orchestration engine to be executed, or may present job number 6 to the technician indicating that a substitute job should be used.

Figure 6:
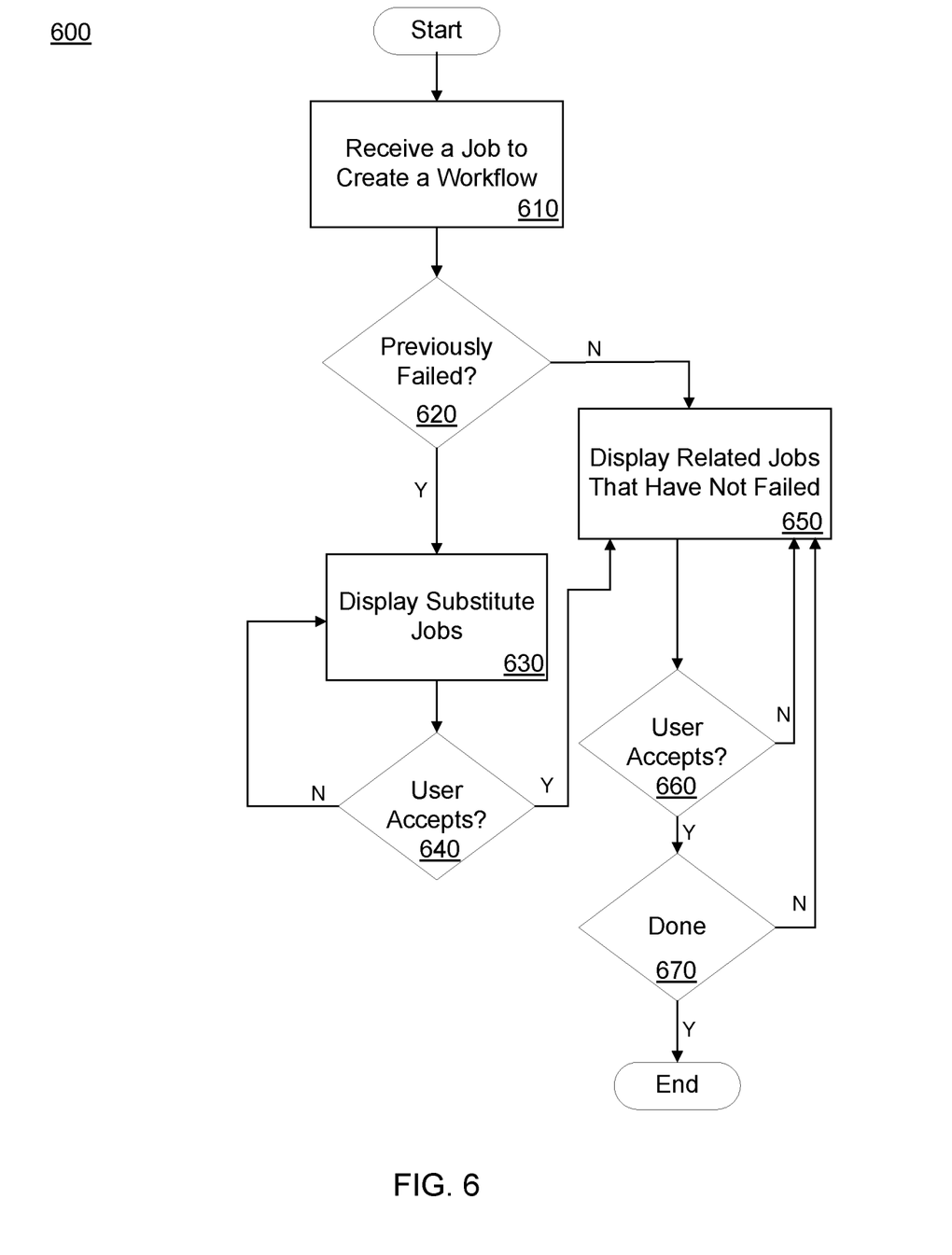
FIG. 6 is a flow diagram of a process according to some embodiments.

Now referring to FIG. 6, an embodiment of a process 600 is illustrated. Process 600 may relate to a user creating a new workflow of analytic jobs where an intelligent decision-making system may recommend jobs to the user based on the jobs that the user has already chained together. The user may specify a few different jobs that could be run in a given step of a workflow, and either provide predefined conditions to indicate which is the best analytic job to run or let the intelligent decision-making system determine which job to execute next based on previous analytic job results.

For example, at 610 the intelligent decision-making system may receive an analytic job, or an indication of the analytic job, that will be used as part of a workflow. The intelligent decision-making system may first check to see if the submitted analytic job has previously failed at 620. If the analytic job has previously failed, the intelligent decision-making system may determine a substitute job for the failed analytic job at 630. However, if the analytic job has not previously failed, the intelligent decision-making system may display related jobs at 650 (e.g., jobs that have not previously failed) so that the user can determine which analytic jobs to string together to create a workflow. The related analytic jobs may comprise system-determined analytic jobs based on previous analytic jobs results and job metadata (e.g., job input and job output). If the user indicates an acceptance of the related analytic job, the related analytic job may be added to the workflow at 660. The user may be shown other related analytic jobs until the user has completed his workflow at 670.

For example, and referring to FIG. 4, a technician may create a workflow of analytic jobs to analyze turbine sensor data and may start with job number 4. The orchestration engine may query an intelligent decision-making system to determine if job number 4 has previously failed. As indicated in database table 400, job number 4 has previously failed. The intelligent decision-making system may then determine that job number 6 may be a substitute job for job number 4. The technician may accept the substitution and indicate that he will use job number 6. The intelligent decision-making system may then present job number 5 to the technician because, as indicated in database table 400, job number 5 has historically been run after job number 6. If the user accepts job number 5, the user may be presented with job number 2 which has historically been run after job number 5. This process may continue until the technician creates a workflow to analyze the turbine sensor data.

Figure 7:
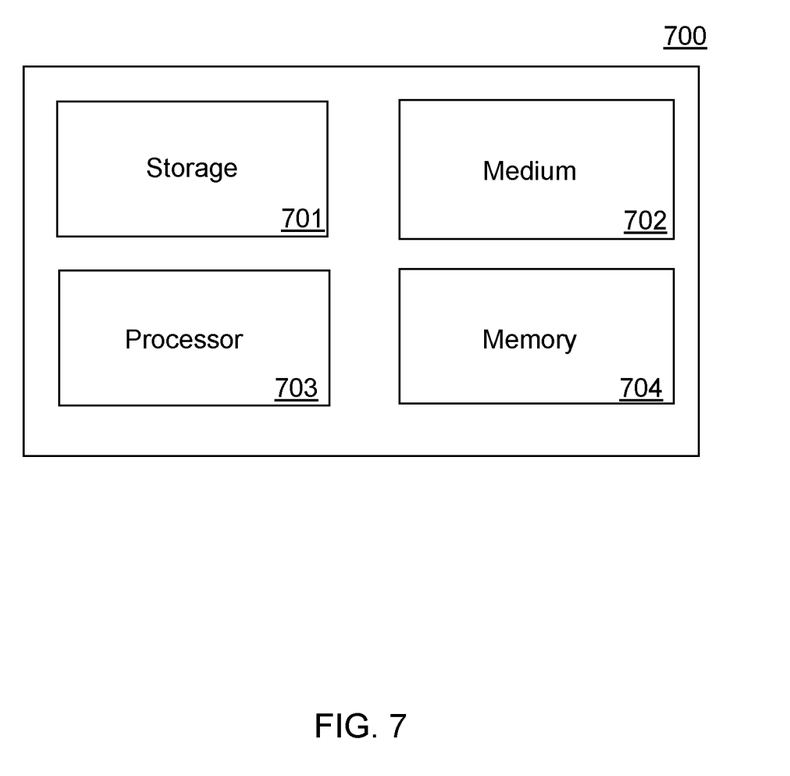
FIG. 7 is a block diagram of a system according to some embodiments.

Now referring to FIG. 7, an embodiment of an apparatus 700 is illustrated. In some embodiments, the apparatus 700 may be associated with an intelligent pipeline manager, such as intelligent pipeline manager 160.

The apparatus 700 may comprise a storage device 701, a medium 702, a processor 703, and a memory 707. According to some embodiments, the apparatus 700 may further comprise a digital display port, such as a port adapted to be coupled to a digital computer monitor, television, portable display screen, or the like.

The medium 702 may comprise any computer-readable medium that may store processor-executable instructions to be executed by the processor 703. For example, the medium 702 may comprise a non-transitory tangible medium such as, but not limited to, a compact disk, a digital video disk, flash memory, optical storage, random access memory, read only memory, or magnetic media.

A program may be stored on the medium 702 in a compressed, uncompiled and/or encrypted format. The program may furthermore include other program elements, such as an operating system, a database management system, and/or device drivers used by the processor 703 to interface with peripheral devices.

The processor 703 may include or otherwise be associated with dedicated registers, stacks, queues, etc. that are used to execute program code and/or one or more of these elements may be shared there between. In some embodiments, the processor 703 may comprise an integrated circuit. In some embodiments, the processor 703 may comprise circuitry to perform a process such as, but not limited to, the process described with respect to FIG. 2, FIG. 5 and FIG. 6.

The processor 703 communicates with the storage device 701. The storage device 701 may comprise any appropriate information storage device, including combinations of magnetic storage devices (e.g., a hard disk drive), optical storage devices, flash drives, and/or semiconductor memory devices. The storage device 701 stores a program for controlling the processor 703. The processor 703 performs instructions of the program, and thereby operates in accordance with any of the embodiments described herein.

The main memory 707 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 707 may comprise a plurality of memory modules.

As used herein, information may be "received" by or "transmitted" to, for example: (i) the apparatus 700 from another device; or (ii) a software application or module within the apparatus 700 from another software application, module, or any other source.

In some embodiments, the storage device 701 stores a database (e.g., including information associated with analytic job history and analytic job metadata). Note that the database described herein is only an example, and additional and/or different information may be stored therein. Moreover, various databases might be split or combined in accordance with any of the embodiments described herein. In some embodiments, an external database may be used.

Embodiments described herein are solely for the purpose of illustration. A person of ordinary skill in the relevant art may recognize other embodiments may be practiced with modifications and alterations to that described above.

What is claimed is:

1. A computer-implemented method comprising:
   receiving a first job in a workflow of jobs to execute;
   executing the first job;
   determining, via a processor, a plurality of data associated with the first job, wherein the plurality of data comprises data associated with (i) a second job executed immediately prior to the first job, (ii) a third job executed immediately after the first job, (iii) a determination of whether the first job failed or executed successfully and (iv) a type of data associated with the first job;
   storing the determined plurality of data;
   receiving an analytic job to execute immediately after the third job;
   determining two or more related jobs to be executed in the workflow instead of the analytic job based on determining that the analytic job had previously failed and determining that the two or more related jobs, in combination, can be substituted for the analytic job by determining that (i) the two more related jobs perform a same function, while the two or more related jobs are performed in combination, as the analytic job and (ii) the two or more related jobs have not previously failed based on previous analytic job results;
   substituting the two or more related jobs for the analytic job in the workflow;
   executing the two or more related jobs; and
   in a case that the two or more related jobs to be performed in combination cannot be determined, exiting the workflow prior to running any remaining jobs associated with the workflow.

2. The method of claim 1, wherein the plurality of data further comprises job inputs and job outputs associated with the first job, the second job and the third job.

3. The method of claim 1, wherein the first job, the second job and the third job are associated with a workflow of analytic jobs.

4. The method of claim 1, further comprising:
   determining that the analytic job executed successfully, and related jobs that have also executed successfully.

5. A non-transitory computer-readable medium comprising instructions executable by a processor of a computing device to cause the computing device to perform a method, the method comprising:
   receiving a first job in a workflow of jobs to execute;
   executing the first job;
   determining, via a processor, a plurality of data associated with the first job, wherein the plurality of data comprises data associated with (i) a second job executed immediately prior to the first job, (ii) a third job executed immediately after the first job, (iii) a determination of whether the first job failed or executed successfully and (iv) a type of data associated with the first job;
   storing the determined plurality of data;
   receiving an analytic job to execute immediately after the third job;
   determining two or more related jobs to be executed in the workflow instead of the analytic job based on determining that the analytic job had previously failed and determining that (i) the two more related jobs perform a same function, while the two or more related jobs are performed in combination, as the analytic job and (ii) the two or more related jobs, in combination, can be substituted for the analytic job by determining that the two or more related jobs have not previously failed based on previous analytic job results;
   substituting the two or more related jobs for the analytic job in the workflow;
   executing the two or more related jobs; and
   in a case that the two or more related jobs to be performed in combination cannot be determined, exiting the workflow prior to running any remaining jobs associated with the workflow.

6. The medium of claim 5, wherein the plurality of data further comprises job inputs and job outputs associated with the first job, the second job and the third job.

7. The medium of claim 5, wherein the first job, second job and the third job are associated with a workflow of analytic jobs.

8. The medium of claim 5, wherein the method further comprises:
   determining that the analytic job executed successfully, and related jobs that have also executed successfully.

9. A system comprising:
   a processor;
   a non-transitory computer-readable medium comprising instructions executable by the processor to cause the system to perform a method, the method comprising:
   receiving a first job in a workflow of jobs to execute;
   executing the first job;
   determining, via a processor, a plurality of data associated with the first job, wherein the plurality of data comprises data associated with (i) a second job executed immediately prior to the first job, (ii) a third job executed immediately after the first job, (iii) a determination of whether the first job failed or executed successfully and (iv) a type of data associated with the first job;
   storing the determined plurality of data;
   receiving an analytic job to execute immediately after the third job;
   determining two or more related jobs to be executed in the workflow instead of the analytic job based on determining that the analytic job had previously failed and determining that (i) the two more related jobs perform a same function, while the two or more related jobs are performed in combination, as the analytic job and (ii) the two or more related jobs, in combination, can be substituted for the analytic job by determining that the two or more related jobs have not previously failed based on previous analytic job results;
   substituting the two or more related jobs for the analytic job in the workflow;
   executing the two or more related jobs; and
   in a case that the two or more related jobs to be performed in combination cannot be determined, exiting the workflow prior to running any remaining jobs associated with the workflow.

10. The system of claim 9, wherein the plurality of data further comprises job inputs and job outputs associated with the first job, the second job and the third job.

11. The system of claim 9, wherein the first job, the second job and the third job are associated with a workflow of analytic jobs.

12. The system of claim 9, wherein the method further comprises:
   determining that the analytic job executed successfully, and related jobs that have also executed successfully.

13. The system of claim 9, wherein the system comprises a Hadoop system.

* * * * *